United States Patent [19]

Serpelloni et al.

[11] Patent Number: 5,629,042
[45] Date of Patent: May 13, 1997

[54] SUGAR-FREE HARD BOILED CANDY AND PROCESS FOR ITS MANUFACTURE

[75] Inventors: Michel Serpelloni, Beuvry les Bethune; Guillaume Ribadeau-Dumas, Lambersart, both of France

[73] Assignee: Roquette Freres, Lestrem, France

[21] Appl. No.: 470,462

[22] Filed: Jun. 6, 1995

[30] Foreign Application Priority Data

Dec. 26, 1994 [FR] France ................... 94 15648

[51] Int. Cl.$^6$ ........................................ A23G 3/00
[52] U.S. Cl. ............... 426/660; 426/548; 426/658
[58] Field of Search ................... 426/660, 658, 426/103, 548

[56] References Cited

U.S. PATENT DOCUMENTS

| | | | |
|---|---|---|---|
| 3,826,857 | 7/1974 | Horn et al. | 426/660 |
| 3,876,794 | 4/1975 | Rennhard | 426/804 |
| 4,452,825 | 6/1984 | Klacik et al. | 426/658 |
| 4,497,846 | 2/1985 | Boursier et al. | 426/660 |
| 4,710,393 | 12/1987 | Holmgren et al. | 426/660 |
| 4,753,816 | 6/1988 | Vink et al. | 426/660 |
| 5,017,400 | 5/1991 | Olinger et al. | 426/658 |
| 5,223,303 | 6/1993 | Taskinen | 426/658 |
| 5,314,701 | 5/1994 | Mentink et al. | 426/103 |
| 5,314,708 | 5/1994 | Gonze et al. | 426/660 |
| 5,424,418 | 6/1995 | DuFlot | 536/103 |
| 5,456,932 | 10/1995 | Fuisz et al. | 426/660 |

FOREIGN PATENT DOCUMENTS

| | | |
|---|---|---|
| 2086207 | 9/1983 | Canada . |
| 2086206 | 9/1993 | Canada . |
| 2086204 | 9/1993 | Canada . |
| 2115801 | 8/1994 | Canada . |
| 0377278A2 | 7/1990 | European Pat. Off. . |
| 0377278A3 | 7/1990 | European Pat. Off. . |
| 0530995 | 3/1993 | European Pat. Off. . |
| 1295006 | 11/1972 | United Kingdom . |

OTHER PUBLICATIONS

"Glass transition : incidents in food technology" by M. Le Meste and D. Simatos Published in I.A.A. of Jan./Feb. 1990.
Database WPI (Week 7317) Derwent Publications Ltd., London, GB; AN 73–24181U & JP A–73 002 784 (Corn Products Co.) *Abstract*.

*Primary Examiner*—Jeanette Hunter
*Attorney, Agent, or Firm*—Larson & Taylor

[57] ABSTRACT

A sugar-free boiled sweet containing at least one water-crystallizable polyol and having a high water-content and a glass transition temperature, measured for a specific water content, at least equal to 38° C. The invention also relates to a process for the manufacture of this sugar-free hard boiled sweet.

28 Claims, No Drawings

SUGAR-FREE HARD BOILED CANDY AND PROCESS FOR ITS MANUFACTURE

The present invention relates to a new sugar-free boiled sweet having a water content greater than the usual contents for this type of confectionery and having, in spite of this high water content, a very high stability.

The invention also relates to a process for the manufacture of this boiled sweet and the use, during its production, of a special carbohydrate composition.

Boiled sweets, also commonly called hard sweets or hard boiled candies, are solid and essentially amorphous confectionery products. They are obtained by extensive dehydration of carbohydrate syrups.

The principal market for boiled sweets still consists today of so-called "sugar" products prepared from nonhydrogenated carbohydrate syrups. But there are also so-called "sugar-free" or "polyol-containing" essentially amorphous boiled sweets which are obtained using hydrogenated carbohydrate syrups.

Sugarless boiled sweets, which are the subject of the present invention, have an increasing success due to the fact that, on the one hand, they do not favour the development of tooth decay and, on the other hand, they are recognized as less caloric than the conventional sucrose boiled sweets, while presenting similar organoleptic characteristics.

Generally, sugar-free hard boiled sweets are manufactured carrying out a boiling of mixtures of polyols dissolved into water. Most often they are maltitol syrups such as those sold by the Applicant under the name LYCASIN® 80/55, MALTISORB® 75/75 or MALTISORB® 70/85, to which one can add polyols in powdered form such as maltitol, mannitol, erythritol or isomalt. The latter can also be used alone after dissolution into water.

These mixtures of polyols are boiled until 150°–200° C. under atmospheric pressure in order to evaporate most of the water, and boiling is generally completed under vacuum, so as to further reduce the water content and to bring it to a value which is normally less than 2.5%, and even less than 1.5%. The so obtained massecuite is then cooled and is cast into moulds or formed on rolls or by extrusion, after having added various substances such as flavourings, colourings, intense sweeteners, acids, plant extracts, vitamins and pharmaceutical active ingredients. After returning to room temperature, the so obtained products have a texture and an appearance similar to those of glass.

Sugar-free boiled sweets are required to be stable over time, that is to say to vary as little as possible from the time when they are manufactured up to the time when they are consumed, so as to remain products which are attractive and pleasant in the mouth.

Now, sugar-free boiled sweets are unfortunately not stable products from a thermodynamic point of view. The extent of their variation depends essentially on their composition after manufacture, but also on the conditions under which they are preserved.

Firstly, sugar-free boiled sweets may become sticky products during storage. When they are wrapped, it then becomes difficult or even impossible to remove their wrapping materials before they are consumed. They may also cake without remaining individualized, which is even more troublesome.

This problematic variation towards a sticky and syrupy state can be explained by surface phenomena and/or by depth phenomena.

The origin of the surface phenomena is in the hygroscopic nature of boiled sweets. It is indeed known that boiled sweets, which are in essence practically anhydrous products, always have very low equilibrium relative humidities, substantially lower than the usual ambient relative humidities for storage. This explains why an uptake of water necessarily occurs at the surface of the sweets as soon as they are and remain exposed to air, as is the case for lollipops for example. When this water uptake is sufficiently high, it tends to liquefy the surface of the sweets and to impart on them the characteristics of a syrup, that is to say in particular to impart on them a sticky character. The lower the water content of the boiled sweets, the quicker this variation appears.

The depth phenomena, which therefore do not only relate to the surface but to the entire mass of the sweets, have a thermal origin. More precisely, it is advisable, in order for these phenomena to occur, that the storage temperature slightly exceed the glass transition temperature of the boiled sweet. This notion to which reference is made here is extensively described in the excellent article "La transition vitreuse : incidences en technologie alimentaire" [Glass transition : incidents in food technology] by M. Le Meste and D. Simatos, published in I.A.A. of January/February, 1990. The glass transition temperature is the temperature at which, upon heating, a glassy and solid boiled sweet becomes an amorphous syrupy liquid. This temperature is normally measured by differential scanning calorimetry. It can be very easily understood that a boiled sweet may be subject to a deformation, or even to a complete flow, when its storage temperature is high and supercedes its glass transition temperature. The product which initially has a dry feel becomes sticky. It should be noted that the higher the water content of the boiled sweet in question, the greater the risk of variation of this nature during its storage.

In conclusion, in order to avoid the boiled sweets becoming sticky products upon storage, it has always appeared necessary that their water content be not too high.

Secondly, boiled sweets can have the tendency during storage to crystallize in an uncontrolled manner and thereby lose their very attractive glassy appearance, resembling more in this case barley sugars which, as is known, are very different from the confectionery products of interest within the framework of the present invention. This crystallization can occur only at the surface of the sweet or alternatively also at the centre of the sweet.

The surface crystallization unavoidably requires a significant water uptake and corresponds to a stage of additional variation relative to that described above. It also requires a sufficient concentration of crystallizable molecules, in general molecules of maltitol, mannitol or isomalt, in the liquefied peripheral layer. When these two conditions are met, a crystallization is then observed which occurs from the surface of the sweet towards its centre. This phenomenon, when it is uncontrolled, is known by the name of turning. It makes the sweets completely opaque and white.

The crystallization can also occur very directly at the centre of the boiled sweet if the latter is very high in water or if the storage temperature is very high. Under these conditions, the boiled sweet is then excessively soft and can no longer be considered as a real solid. It is then more a liquid supersaturated with crystallizable molecules whose variation toward a crystalline state is unavoidable and practically spontaneous. Specialists designate this type of crystallization by the term graining. This phenomenon is particularly observed with sorbitol cast hard candies.

In the final analysis, in order to avoid the boiled sweets being unstable and becoming, over time, sticky products or alternatively turned or grained products, it has always seemed essential to adjust their content of water.

For sugar-free boiled sweets, it has always been considered that this value of the water content was the most essential characteristic to be taken into account. This is clearly indicated for example in Patents EP 094,292; EP 518,770 and EP 611,527, where a value which is always less than 3% is recommended in order to obtain sufficiently stable products.

No stable sugar-free boiled sweet is known which contains more than 3.0% of water, except certain sorbitol sweets which are grained products right from their manufacture.

Up until now, it seems that no viable solutions exist which make it possible to prepare essentially amorphous sugar-free boiled sweets which are high in water and are stable. Such products would nevertheless be advantageous in many respects, especially because of the fact that they would be of a lower cost for a quality identical to or even better than that of commercially available products.

The aim of the invention is to overcome the disadvantages of the prior art and to provide a new sugar-free boiled sweet which satisfies, much better than existing products, the expectations of confectionery manufacturers and the various requirements of practical use, that is to say having a substantially improved storage stability.

At the end of detailed research studies, the merit of the applicant company is to have found that this aim could be achieved and that, against all expectations, it was possible to prepare a sugar-free boiled sweet which is stable although containing a high water content, that is to say greater than 3%.

This sugar-free boiled sweet can be described as "stable" since over time it does not tend:

either to become sticky, or to grain, or to turn, becoming opaque and white at the surface or at the centre, or to deform at the usual summer temperatures in temperate climates.

The applicant company has discovered, surprisingly and unexpectedly, that in order to obtain a stable sugar-free boiled sweet having an abnormally high water content, it is advisable both to adjust the quantity of crystallizable polyols in the confectionery so that a microcrystallization of said polyols can take place at the surface of the sweet, and to ensure that the glass transition temperature of the sweet, which is necessarily reduced because of the higher water content, is corrected by the appropriate choice of a carbohydrate composition.

By the term of "crystallizable polyols" are meant according to the present invention the hydrogenated mono- and disaccharides which are susceptible to be crystallized in water. Advantageously, they consist of maltitol, isomalt, mannitol or erythritol. Other crystallizable polyols, such as sorbitol, xylitol, or lactitol can also be used but the Applicant has noticed that they generate a surface microcrystallization with more difficulty.

By the term of "microcrystallization" is meant, according to the present invention, a crystallization of the crystallizable polyols which remains almost invisible to the naked eye on or inside the boiled sweet and which, in all cases, does not render the boiled sweet white and opaque.

In other words, it is essential, for such a sugar-free boiled sweet to be stable, that it have both a convenient content in at least one crystallizable polyol and a glass transition temperature at least equal to 38° C., this glass transition temperature being measured at a water content close to 3.2%.

The subject of the invention is therefore a sugar-free boiled sweet characterized in that it has:

a water content greater than 3%, a content in at least one crystallizable polyol comprised between 5% and 100%, preferably between 10 and 90%, and still more preferably between 15 and 77%, this content being expressed on a dry matter basis, and a glass transition temperature at least equal to 38° C., this glass transition temperature being measured at a water content of about 3.2%.

Preferably, the crystallizable polyol is chosen among maltitol, isomalt, mannitol and erythritol.

The sugar-free boiled sweet according to the invention is characterized in that it contains more than 3% of water and a particular composition of carbohydrates which are suitable for conferring on it a glass transition temperature at least equal to 38° C., this temperature being measured for a water content of about 3.2%. Advantageously, this sugar-free boiled sweet contains more than 3.2%, more preferably more than 3.5% and still more preferably more than 4.0% of water. Compared with known sugar-free boiled sweets, it has the advantage of being able to be produced by boiling at a temperature which is not very high.

Preferably, the sugar-free boiled sweet according to the invention has a glass transition temperature greater than 38° C. for the effective water content of the boiled sweet.

The particular composition of carbohydrates suitable for use according to the invention may be chosen from the hydrogenated syrups describe in patent applications EP 0,561,089, EP 0,561,088 and EP 0,611,527 of which the applicant company is proprietor and preferably from the syrups which are described in these applications and which contain from 45 to 77% of maltitol or of hydrogenated isomaltulose and more than 10%, and preferably between 20 to 55%, of hydrogenated oligo- and polysaccharides.

The preferred syrups are syrups of an average content in maltitol or in isomalt. It has been noticed that when these syrups have too high contents in maltitol or isomalt, i.e. contents between 77 and 90%, the obtained sugar-free hard candies are rather hygroscopic and subject to breaking during wrapping. Moreover, with such syrups, it is very difficult to manufacture sugar-free boiled sweets having a glass transition temperature higher than 38° C. when they have, in accordance with the invention, a particularly high content in water. Consequently, it is preferred to use, according to the invention, syrups containing from 45 to 77% of maltitol or isomalt, more preferably from 45 to 65% of maltitol or isomalt and still more preferably from 50 to 60% of maltitol or isomalt. Surprisingly and unexpectedly, it has been observed that these average contents allow an easier obtention of a surface microcrystallization, for the water contents which are imposed according to the invention, than higher contents or contents which were previously recommended, for example in U.S. Pat. No. 5,314,708.

So, it is possible to obtain sugar-free hard boiled sweets which are definitely more stable than those of the prior art, despite a lower maltitol or isomalt content than usual.

Maltitol syrups can be produced either directly by starch hydrolysis, notably under the action of a beta-amylase, or indirectly by mixture of liquid or solid products, at least one of which is high in maltitol. Isomalt syrups can also be prepared by mixture.

The complement to 100% of the dry matter of the sugar-free hard candy in accordance with the invention can be constituted of oligo-saccharides and polysaccharides which are reputed to be scarcely digestible, that is to say less digestible than sugars. They may be in particular oligo-saccharides and polysaccharides, dextrins, or polyglucoses such as polydextroses, such as those obtained, after hydrogenation or otherwise, according to the process described in patent application EP 561,090 of which the applicant company is proprietor, or alternatively according to the process described in patent application EP 368,451.

The particular carbohydrate composition suitable to be used in accordance with the invention can be a syrup containing from 5 to 45%, preferably 10 to 40% and more preferably from 15 to 35% of mannitol or erythritol. The complement to 100% of the dry matter may consist of digestible oligo-saccharides or polysaccharides coming from starch hydrolysis, preferably hydrogenated, or can be slightly digestible oligo-saccharides and polysaccharides such as those previously defined.

It should be noted that by the appropriate choice of the particular carbohydrate composition, it is possible to prepare a noncariogenic sugar-free boiled sweet.

Another characteristic of the sugar-free boiled sweet in accordance with the invention is that it has a water activity greater than that of a customary boiled sweet. Normally, the boiled sweet in accordance with the invention has a water activity greater than 0.30. In the case preferred, that is to say that of sweets having even higher water contents, the water activity is greater than 0.32, or even greater than 0.35.

The applicant company has observed that an even greater stability is obtained by making sure that the glass transition temperature, measured for a water content of about 3.2%, and preferably for the effective water content of the boiled sweet, is at least equal to 40° C., the ideal situation being to exceed 43° C. and even better to exceed 45° C.

The sugar-free boiled sweet in accordance with the invention has several advantages.

It can be manufactured at a lower temperature than normal, which makes it possible to substantially reduce the manufacturing costs but also to limit the time for blocking equipment. In general, the boiling temperatures can be decreased by several degrees. Very often, this reduction is as much as 10° to 15° C. compared with the usual temperatures.

The sugar-free boiled sweet in accordance with the invention is moreover not very hygroscopic. It has been observed that the rates of water uptake from the ambient atmosphere are lower than those of traditional boiled sweets from the first few days following manufacture and that microcrystallization is subsequently possible. This is the case in particular during the use of maltitol syrups, and especially, unexpectedly, during the use of syrups having an average maltitol content, that is to say a content of 45% to 77% relative to the dry composition. The crystallization remains in all cases invisible to the naked eye, such that the boiled sweet has the advantage of remaining completely transparent.

The sugar-free boiled sweet in accordance with the invention also tends to be very light in colour due to the possibility of carrying out the boiling at a lower temperature.

Finally, the sugar-free boiled sweet in accordance with the invention is very stable to temperature and does not tend to run or to deform at summer temperatures in our temperature climate.

The invention also relates to a process for the preparation of a new sugar-free stable boiled sweet, although containing more water than normal. This process is characterized in that it comprises the preparation of a syrup containing on a dry basis from 5% to 100% of a crystallizable polyol preferably selected from the group consisting of maltitol, isomalt, mannitol and erythritol, suitable for conferring on the sugar-free boiled sweet a glass transition temperature at least equal to 38° C., measured for a water content of about 3.2%. It is also characterized in that it comprises the boiling of the syrup thus prepared at a temperature sufficient to allow the vitrification of a massecuite containing more than 3.0%, preferably more than 3.2% and still more preferably more than 3.5% of water.

The other unit operations for the manufacture of the new sugar-free boiled sweet may be identical to those normally carried out for sugar-based or sugar-free hard boiled sweets. Accordingly, the sugar-free boiled sweet can be equally well shaped by known casting, forming or extrusion techniques.

It should be stated that the quantity of water to be added in order to prepare the carbohydrate syrup intended for the manufacture of the sugar-based boiled sweet of the invention can be advantageously substantially reduced compared to the usual quantities, taking into account the use of a smaller quantity of crystallizable polyol compared to normal.

It must also be noted that high intense sweeteners, flavours, colorants, and/or flavour or sweeteners enhancers like maltol or ethyl maltol may be used without any problem so as to adjust the organoleptic properties of the sugar-free boiled sweet according to the invention.

The invention will be understood more clearly in the light of the following examples which are intended to be illustrative of the invention and not limitative.

EXAMPLE 1

Sugar-free sweets with a high water content.

Sugar-free sweets are prepared with the aid of a pilot boiler using a composition as described in patent application EP 0,611,527, More precisely, a maltitol syrup containing, on a dry basis, 50% of maltitol and 50% of polysaccharides with a molecular weight greater than 3,000, is used.

Boiling is carried out at 145° C. under vacuum.

The sweets obtained, which are in accordance with the invention, are very stable and have a water content close to 3.4% and a glass transition temperature close to 42° C.

It is noticed that compared to the use of LYCASIN® 80/55 maltitol syrup, whichis marketed by the applicant and which contains about 50% of maltitol, it has been possible to decrease by about 15° C. the cooking temperature which is necessary to obtain a similar glass transition temperature, which is really advantageous as far as the costs are concerned.

EXAMPLE 2

Hypocaloric sugar-free sweets with a high water content.

Hypocaloric sugar-free sweets are prepared with the aid of the same pilot boiler as in example 1, using a syrup having a dry matter content of 75% and containing in the dissolved state, based on the dry matter, 85% of polydextrose marketed by PFIZER under the trademark LITESSE® II and 15% of mannitol marketed by the applicant.

Boiling is carried out at 150° C. without applying any vacuum.

The massecuite is cooled to 100° C. and then a flavouring agent and a sweetening mixture of aspartame and of acesulfame K are added. The resulting mass is then formed on rolls.

The sweets so obtained, which are in accordance with the invention, have a water content of 3.10% and a glass transition temperature close to 45° C.

Upon storage, these hypocaloric sugar-free boiled sweets prove to be particularly stable and really less hygroscopic than conventional sugar-free hard candies manufactured with LITESSE®II alone or with LYCASIN®80/55 maltitol syrup.

These hypocaloric sweets are also more stable than those present on the market which are prepared with isomalt or MALTISORB® 70/85 maltitol syrup. Indeed, contrary to the latter, they do not tend to grain and to whiten at the surface.

The hypocaloric sugar-free sweets according to the invention show, after some days of storage, a microcrystallization of mannitol at the surface of the sweets, which is visible under microscope but almost invisible to the naked eye. These sweets do not evolve any more.

We claim:

1. Sugar-free hard boiled candy containing:
   more than 3% of water,
   on a dry matter basis, from 5 to 100% of at least one crystallizable polyol, the balance to 100% being essentially a composition of slightly digestible or hydrogenated carbohydrates which are suitable for conferring on the sugar-free hard boiled candy a glass transition temperature at least equal to 38° C., this temperature being measured for a water content of about 3.2%.

2. Sugar-free hard boiled candy according to claim 1, containing more than 3.2% of water.

3. Sugar-free hard boiled candy according to claim 2, containing more than 3.5% of water.

4. Sugar-free hard boiled candy according to claim 3, containing more than 4.0% of water.

5. Sugar-free hard boiled candy according to claim 1, having a glass transition temperature of at least 40° C., said temperature being measured for a water content of about 3.2%.

6. Sugar-free hard boiled candy according to claim 5, having a glass transition temperature of at least 43° C., said temperature being measured for a water content of about 3.2%.

7. Sugar-free hard boiled candy according to claim 6, having a glass transition temperature of at least 45° C., said temperature being measured for a water content of about 3.2%.

8. Sugar-free hard boiled candy containing:
   more than 3% of water,
   on a dry matter basis, from 5 to 100% of at least one crystallizable polyol, the balance to 100% being essentially a composition of slightly digestible or hydrogenated carbohydrates which are suitable for conferring on the sugar-free hard boiled candy a glass transition temperature at least equal to 38° C., this temperature being measured for its effective water content.

9. Sugar-free hard boiled candy according to claim 8, containing more than 3.2% of water.

10. Sugar-free hard boiled candy according to claim 9, containing more than 3.5% of water.

11. Sugar-free hard boiled candy according to claim 10, containing more than 4.0% of water.

12. Sugar-free hard boiled candy according to claim 8, having a glass transition temperature of at least 40° C., said temperature being measured for its effective water content.

13. Sugar-free hard boiled candy according to claim 12, having a glass transition temperature of at least 43° C., said temperature being measured for its effective water content.

14. Sugar-free hard boiled candy according to claim 13, having a glass transition temperature of at least 45° C., said temperature being measured for its effective water content.

15. Sugar-free hard boiled candy according to claim 1, wherein the crystallizable polyol is selected from the group consisting of maltitol, isomalt, mannitol, erythritol, sorbitol, xylitol and lactitol.

16. Sugar-free hard boiled candy according to claim 8, wherein the crystallizable polyol is selected from the group consisting of maltitol, isomalt, mannitol, erythritol, sorbitol, xylitol and lactitol.

17. Sugar-free hard boiled candy according to claim 15, wherein the crystallizable polyol is selected from the group consisting of maltitol, isomalt, mannitol and erythritol.

18. Sugar-free hard boiled candy according to claim 16, wherein the crystallizable polyol is selected from the group consisting of maltitol, isomalt, mannitol and erythritol.

19. Sugar-free hard boiled candy according to claim 1, containing as crystallizable polyol, from 45 to 77% of maltitol or isomalt.

20. Sugar-free hard boiled candy according to claim 1, containing as crystallizable polyol, from 5 to 45% of mannitol or erythritol.

21. Sugar-free hard boiled candy according to claim 8, containing, as crystallizable polyol, from 45 to 77% of maltitol or isomalt.

22. Sugar-free hard boiled candy according to claim 8, containing, as crystallizable polyol, from 5 to 45% of mannitol or erythritol.

23. Process for the preparation of a stable sugar-free hard boiled candy comprising:
   (a) the preparation of a syrup containing, on a dry matter basis, from 5 to 100% of a crystallizable polyol selected from the group consisting of maltitol, isomalt, mannitol, erythritol, sorbitol, xylitol or lactitol, said syrup being suitable for conferring on the hard boiled candy a glass transition temperature at least equal to 38° C., this temperature being measured for a water content of about 3.2%,
   (b) the boiling of the said syrup at a temperature sufficient to allow the verification of a massecuite containing more than 3.0% of water.

24. Process according to claim 23, wherein the boiling of the syrup is performed at a temperature sufficient to allow the vitrification of a massecuite containing more than 3.2% of water.

25. Process according to claim 24, wherein the boiling of the syrup is performed at a temperature sufficient to allow the vitrification of a massecuite containing more than 3.5% of water.

26. Process for the preparation of a stable sugar-free hard boiled candy comprising:
   (a) the preparation of a syrup containing, on a dry matter basis, from 5 to 100% of a crystallizable polyol selected from the group consisting of maltitol, isomalt, mannitol, erythritol, sorbitol, xylitol or lactitol, said syrup being suitable for conferring on the hard boiled candy a glass transition temperature at least equal to 38° C., this temperature being measured for the effective water content of the hard-boiled candy,
   (b) the boiling of the said syrup at a temperature sufficient to allow the vitrification of a massecuite containing more than 3.0% of water.

27. Process according to claim 26, wherein the boiling of the syrup is carried out at a temperature sufficient to allow the vitrification of a massecuite containing more than 3.2% of water.

28. Process according to claim 27, wherein the boiling of the syrup is carried out at a temperature sufficient to allow the vitrification of a massecuite containing more than 3.5% of water.

* * * * *